United States Patent
Park (10) Patent No.: US 9,766,386 B2
(45) Date of Patent: Sep. 19, 2017

(54) OPTICAL MEMBER AND DISPLAY DEVICE HAVING THE SAME

(75) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 54 days.

(21) Appl. No.: 14/234,123

(22) PCT Filed: Jun. 12, 2012

(86) PCT No.: PCT/KR2012/004625
§ 371 (c)(1),
(2), (4) Date: Jan. 21, 2014

(87) PCT Pub. No.: WO2013/012173
PCT Pub. Date: Jan. 24, 2013

(65) Prior Publication Data
US 2014/0160790 A1 Jun. 12, 2014

(30) Foreign Application Priority Data
Jul. 18, 2011 (KR) .................. 10-2011-0071135

(51) Int. Cl.
| | |
|---|---|
| F21V 7/04 | (2006.01) |
| F21V 8/00 | (2006.01) |
| B82Y 20/00 | (2011.01) |
| F21V 9/16 | (2006.01) |
| G02F 1/1335 | (2006.01) |

(52) U.S. Cl.
CPC ............ G02B 6/0026 (2013.01); B82Y 20/00 (2013.01); F21V 9/16 (2013.01); G02B 6/0023 (2013.01); G02F 1/133609 (2013.01); *G02B 6/0085* (2013.01); *G02F 2001/133614* (2013.01)

(58) Field of Classification Search
CPC .. G02B 6/0043; G02B 6/0073; G02B 6/0023; G02B 5/0242; G02B 6/004
USPC .................................................. 362/621, 622
See application file for complete search history.

(56) References Cited

U.S. PATENT DOCUMENTS

| | | |
|---|---|---|
| 5,998,925 A | 12/1999 | Shimizu et al. |
| 7,004,610 B2 | 2/2006 | Yamashita et al. |
| 7,040,774 B2 | 5/2006 | Beeson et al. |
| 7,481,562 B2 | 1/2009 | Chua et al. |

(Continued)

FOREIGN PATENT DOCUMENTS

| | | |
|---|---|---|
| CN | 1758114 A | 4/2006 |
| CN | 1869788 A | 11/2006 |

(Continued)

OTHER PUBLICATIONS

Office Action dated Jun. 25, 2014 in Taiwanese Application No. 10-1121880.

(Continued)

*Primary Examiner* — William Carter
(74) *Attorney, Agent, or Firm* — Saliwanchik, LLoyd & Eisenschenk (57) ABSTRACT

Disclosed are an optical member, a display device having the same, and a method of fabricating the same. The optical member includes a receiving part having an empty space therein, a host in the receiving part, a plurality of wavelength conversion particles in the host, a sealing part in the receiving part, and a pre-treatment layer between the sealing part and an inner surface of the receiving part.

20 Claims, 3 Drawing Sheets

(56) References Cited

U.S. PATENT DOCUMENTS

| | | | |
|---|---|---|---|
| 7,795,055 B2 | 9/2010 | Lee et al. | |
| 8,038,822 B2 | 10/2011 | Kindler et al. | |
| 8,545,083 B2* | 10/2013 | Terajima | G02B 6/0021 362/606 |
| 9,110,200 B2 | 8/2015 | Nichol et al. | |
| 9,244,209 B2 | 1/2016 | Lee et al. | |
| 9,304,355 B2 | 4/2016 | Lee | |
| 9,335,459 B2 | 5/2016 | Kang | |
| 2001/0001207 A1 | 5/2001 | Shimizu et al. | |
| 2002/0001055 A1 | 1/2002 | Kimura et al. | |
| 2002/0071071 A1 | 6/2002 | Sekiguchi et al. | |
| 2003/0066998 A1 | 4/2003 | Lee | |
| 2003/0165781 A1 | 9/2003 | Takeda | |
| 2004/0046242 A1 | 3/2004 | Asakawa | |
| 2004/0190279 A1 | 9/2004 | Kitamura | |
| 2005/0001225 A1 | 1/2005 | Yoshimura et al. | |
| 2005/0221519 A1 | 10/2005 | Leung et al. | |
| 2006/0002101 A1 | 1/2006 | Wheatley et al. | |
| 2006/0034084 A1 | 2/2006 | Matsuura et al. | |
| 2006/0034579 A1 | 2/2006 | Sugiura | |
| 2006/0072315 A1 | 4/2006 | Han et al. | |
| 2006/0092666 A1 | 5/2006 | Jeong et al. | |
| 2006/0132034 A1 | 6/2006 | Cho et al. | |
| 2006/0227532 A1 | 10/2006 | Ko et al. | |
| 2006/0227570 A1 | 10/2006 | Rutherford et al. | |
| 2006/0268537 A1 | 11/2006 | Kurihara et al. | |
| 2006/0268579 A1 | 11/2006 | Han et al. | |
| 2007/0004195 A1 | 1/2007 | Park et al. | |
| 2007/0012940 A1 | 1/2007 | Suh et al. | |
| 2007/0176196 A1 | 8/2007 | Kim et al. | |
| 2007/0210326 A1 | 9/2007 | Kurihara | |
| 2007/0221865 A1 | 9/2007 | Sohn et al. | |
| 2007/0221866 A1 | 9/2007 | Sohn et al. | |
| 2007/0221943 A1 | 9/2007 | Moriya et al. | |
| 2007/0228390 A1 | 10/2007 | Hattori et al. | |
| 2007/0229736 A1 | 10/2007 | Wang et al. | |
| 2007/0263408 A1 | 11/2007 | Chua | |
| 2008/0037272 A1 | 2/2008 | Song et al. | |
| 2008/0112186 A1 | 5/2008 | Jung et al. | |
| 2008/0237540 A1 | 10/2008 | Dubrow | |
| 2008/0284316 A1* | 11/2008 | Kurihara | H05B 33/145 313/503 |
| 2009/0014688 A1 | 1/2009 | Hoshino et al. | |
| 2009/0021148 A1 | 1/2009 | Hachiya et al. | |
| 2009/0034292 A1 | 2/2009 | Pokrovskiy et al. | |
| 2009/0040598 A1 | 2/2009 | Ito | |
| 2009/0115936 A1 | 5/2009 | Takeuchi et al. | |
| 2009/0147497 A1 | 6/2009 | Nada | |
| 2009/0152567 A1 | 6/2009 | Comerford et al. | |
| 2009/0173957 A1 | 7/2009 | Brunner et al. | |
| 2009/0231847 A1 | 9/2009 | Pan et al. | |
| 2010/0079901 A1 | 4/2010 | Fukushima | |
| 2010/0103648 A1 | 4/2010 | Kim et al. | |
| 2010/0110728 A1* | 5/2010 | Dubrow | C09K 11/025 362/615 |
| 2010/0155749 A1 | 6/2010 | Chen et al. | |
| 2010/0164364 A1 | 7/2010 | Eida et al. | |
| 2010/0187975 A1 | 7/2010 | Tsukahara et al. | |
| 2010/0232133 A1 | 9/2010 | Tran et al. | |
| 2010/0232134 A1 | 9/2010 | Tran | |
| 2010/0283072 A1 | 11/2010 | Kazlas et al. | |
| 2010/0295438 A1 | 11/2010 | Ott et al. | |
| 2010/0302493 A1 | 12/2010 | Yang et al. | |
| 2010/0315320 A1 | 12/2010 | Yoshida | |
| 2011/0002140 A1 | 1/2011 | Tsukahara et al. | |
| 2011/0037926 A1* | 2/2011 | Tsukahara et al. | 362/612 |
| 2011/0044046 A1 | 2/2011 | Abu-Ageel | |
| 2011/0090696 A1* | 4/2011 | Nagai et al. | 362/293 |
| 2011/0141769 A1 | 6/2011 | Lee et al. | |
| 2011/0156575 A1 | 6/2011 | Yu et al. | |
| 2011/0176328 A1 | 7/2011 | Anandan et al. | |
| 2011/0205750 A1 | 8/2011 | Krijn et al. | |
| 2011/0249424 A1 | 10/2011 | Joo et al. | |
| 2011/0261303 A1 | 10/2011 | Jang et al. | |
| 2011/0299011 A1 | 12/2011 | Weiss et al. | |
| 2012/0106197 A1 | 5/2012 | Lai et al. | |
| 2012/0113672 A1 | 5/2012 | Dubrow et al. | |
| 2012/0170282 A1 | 7/2012 | Lin et al. | |
| 2013/0128548 A1 | 5/2013 | Lin | |
| 2014/0049826 A1 | 2/2014 | Lee et al. | |
| 2014/0153218 A1 | 6/2014 | Hyun | |
| 2014/0160789 A1 | 6/2014 | Park | |
| 2014/0168571 A1 | 6/2014 | Hyun | |
| 2015/0369993 A1 | 12/2015 | Kim et al. | |

FOREIGN PATENT DOCUMENTS

| | | |
|---|---|---|
| CN | 1880839 A | 12/2006 |
| CN | 1881034 A | 12/2006 |
| EP | 2068193 A2 | 6/2009 |
| JP | 09073807 A | 3/1997 |
| JP | 2004303441 A | 10/2004 |
| JP | 2004315661 A | 11/2004 |
| JP | 2007005098 A | 1/2007 |
| JP | 2007-173754 A | 7/2007 |
| JP | 2008287073 A | 11/2008 |
| JP | 2008311234 A | 12/2008 |
| JP | 2009-200534 A | 9/2009 |
| JP | 2010-123918 A | 6/2010 |
| KR | 20060056834 A | 5/2006 |
| KR | 20060125535 A | 12/2006 |
| KR | 20060129835 A | 12/2006 |
| KR | 20070092440 A | 9/2007 |
| KR | 20080007247 A | 1/2008 |
| KR | 20080063986 A | 7/2008 |
| KR | 10-2009-0021912 A | 3/2009 |
| KR | 10-2010-0027892 A | 3/2010 |
| KR | 20100024420 A | 3/2010 |
| KR | 10-2010-0046698 A | 5/2010 |
| KR | 20100047841 A | 5/2010 |
| KR | 20100118557 A | 11/2010 |
| KR | 20100129030 A | 12/2010 |
| KR | 20110012246 A | 2/2011 |
| KR | 20110068110 A | 6/2011 |
| KR | 20120001387 A | 1/2012 |
| KR | 1020120070449 A | 6/2012 |
| KR | 1020130009022 A | 1/2013 |
| TW | 200409384 | 6/2004 |
| TW | 200702822 | 1/2007 |
| TW | 200739192 | 10/2007 |
| TW | 200803600 A | 1/2008 |
| TW | 200821697 A | 5/2008 |
| TW | 200848809 A | 12/2008 |
| TW | 201035484 A | 10/2010 |
| TW | 201041191 A | 11/2010 |
| TW | 201044067 A | 12/2010 |
| TW | 201105767 A | 2/2011 |
| WO | WO-2012144720 A1 | 10/2012 |

OTHER PUBLICATIONS

International Search Report in International Application No. PCT/KR2012/004625, dated Dec. 24, 2012.

Notice of Allowance dated Apr. 12, 2013 in Korean Application No. 10-2011-0071135.

European Search Report in European Application No. 12814589.3, dated Apr. 16, 2015.

Final Office Action dated Jul. 30, 2015 in U.S. Appl. No. 14/233,440.

European Search Report dated Sep. 7, 2015 in European Application No. 15172626.2.

International Search Report in International Application No. PCT/KR2012/004611, filed Jun. 11, 2012.

Taiwanese Office Action dated Jan. 23, 2015 in Taiwanese Application No. 101125849.

European Search Report dated Feb. 12, 2015 in International Application No. PCT/KR2012/004611.

International Search Report in International Application No. PCT/KR2012/004521, filed Jun. 8, 2012.

Office Action dated Dec. 3, 2014 in Taiwanese Application No. 101121510.

(56) References Cited

OTHER PUBLICATIONS

Office Action dated Dec. 24, 2012 in Korean Application No. 10-2011-0069797.
Office Action dated Aug. 18, 2015 in U.S. Appl. No. 14/232,843.
International Search Report in International Application No. PCT/KR2011/009232, filed Nov. 30, 2011.
Office Action dated Jul. 31, 2012 in Korean Application No, 10-2011-0009833.
Office Action dated Mar. 13, 2015 in U.S. Appl. No. 13/982,916.
Office Action dated Mar. 16, 2016 in U.S. Appl. No. 13/982,916.
International Search Report in International Application No. PCT/KR2012/006308, filed Aug. 8, 2012.
Office Action dated Jan. 28, 2016 in Chinese Application No. 201280066300.9.
Office Action dated Aug. 30, 2016 in U.S. Appl. No. 14/234,123.
Office Action dated Jun. 19, 2015 in U.S. Appl. No. 14/234,123.
Office Action dated Dec. 14, 2016 in U.S. Appl. No. 14/234,123.
Office Action dated Nov. 25, 2016 in U.S. Appl. No. 14/747,577.
Office Action dated Dec. 29, 2016 in U.S. Appl. No. 15/136,239.
Office Action dated Jul. 5, 2016 in U.S. Appl. No. 14/356,657.
Office Action dated Jan. 5, 2017 in U.S. Appl. No. 14/356,657.
European Search Report in European Application No. 12814403.7 dated Feb. 13, 2015.
International Search Report in International Application No. PCT/KR2012/005418, filed Jul. 9, 2012.
Office Action dated Apr. 6, 2016 in Taiwanese Application No. 101126235.
Office Action dated Jul. 6, 2015 in U.S. Appl. No. 14/234,117.
Office Action dated Jan. 21, 2016 in U.S. Appl. No. 14/234,117.
International Search Report in International Application No. PCT/KR2012/005353, filed Jul. 5, 2012.
European Search Report dated May 22, 2015 in European Application No. 12811675.3.
Office Action dated Jul. 6, 2015 in U.S. Appl. No. 14/232,850.
Office Action dated Jun. 1, 2016 in U.S. Appl. No. 14/232,850.
Notice of Allowance dated Nov. 17, 2016 in U.S. Appl. No. 14/232,850.
Office Action dated Jun. 24, 2014, in Taiwanese Application No. 101122681.
European Search Report in European Application No. 12815508.2 filed May 28, 2014.
International Search Report in International Application No. PCT/KR2012/004610, filed Dec. 24, 2012.
Office Action dated Apr. 27, 2017 in Taiwanese Application No. 101121880.

* cited by examiner

OPTICAL MEMBER AND DISPLAY DEVICE HAVING THE SAME

CROSS-REFERENCE TO RELATED APPLICATIONS

This application is the U.S. national stage application of International Patent Application No. PCT/KR2012/004625, filed Jun. 12, 2012, which claims priority to Korean Application No. 10-2011-0071135, filed Jul. 18, 2011, the disclosures of each of which are incorporated herein by reference in their entirety.

TECHNICAL FIELD

The embodiment relates to an optical member and a display device having the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed with each other by the quantum dots distributed in the quantum dot bar and the mixed light is incident into the light guide plate, so that white light is generated.

If the white light is supplied to the light guide plate by using the quantum dot bar, high color reproduction may be realized.

The backlight unit may include an FPCB (flexible printed circuit board) provided at one side of the blue LED, which generates blue light, to supply signals and power to the LED and a bonding member formed under the bottom surface of the FPCB.

The display device capable of displaying various images using the white light supplied to the light guide plate through the quantum dot bar as the blue light is emitted from the blue LED has been extensively used.

The display device employing the quantum dots is disclosed in Korean Unexamined Patent Publication No. 10-2011-0068110.

DISCLOSURE OF INVENTION

Technical Problem

The embodiment provides an optical member representing improved brightness, improved brightness uniformity, improved reliability, and improved color reproduction, and a display device.

Solution to Problem

According to the embodiment, there is provided an optical member including a receiving part, a host in the receiving part, and a plurality of wavelength conversion particles in the host. The receiving part includes a light incident part making contact with the host, and a light exit part in which the host is sandwiched between the light incident part and the light exit part.

According to the embodiment, there is provided a display device including a light source, a wavelength conversion member at a light exit surface of the light source, and a display panel to receive a light output from the wavelength conversion member. The wavelength conversion member includes a receiving part at the light exit surface of the light source, a host in the receiving part, and a plurality of wavelength conversion particles in the host.

According to the embodiment, the receiving part includes a light incident part between the host and the light source, and a thickness of the light incident part is in a range of about 100 µm to about 1000 µm.

According to the embodiment, a thickness of the light incident part is greater than a thickness of the light exit part.

Advantageous Effects of Invention

As described above, in the optical member and the display device according to the embodiment, the thickness of the light incident part is greater than the thickness of the light exit part. In particular, the thickness of the light incident part may be in the range of about 100 µm to about 1000 µm. Therefore, after the light output from the light source has been sufficiently diffused through the light incident part, the light is incident into the host.

Therefore, according to the optical member and the display device of the embodiment, the light output from the light source can be prevented from being concentrated on the specific region, so that the wavelength conversion particles can be prevented from being degraded.

Therefore, the optical member and the display device according to the embodiment can represent improved reliability. According to the optical member and the display device of the embodiment, color reproduction can be prevented from being degraded due to the heat, and the whole wavelength conversion particles can be used. Therefore, the optical member and the display device according to the embodiment can represent improved color reproduction.

In addition, since the light output from the light source is sufficiently diffused through the light incident part, the optical member and the display device according to the embodiment can represent improved brightness and improved brightness uniformity.

MODE FOR THE INVENTION

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, frame, sheet, layer, or pattern, one or more intervening layers may also be present. Such a position of each element has been described with reference to the drawings. The thickness and size of each element shown in the drawings may be exaggerated, omitted or schematically drawn for the purpose of convenience or clarity. In addition, the size of elements does not utterly reflect an actual size.

Figure 1:
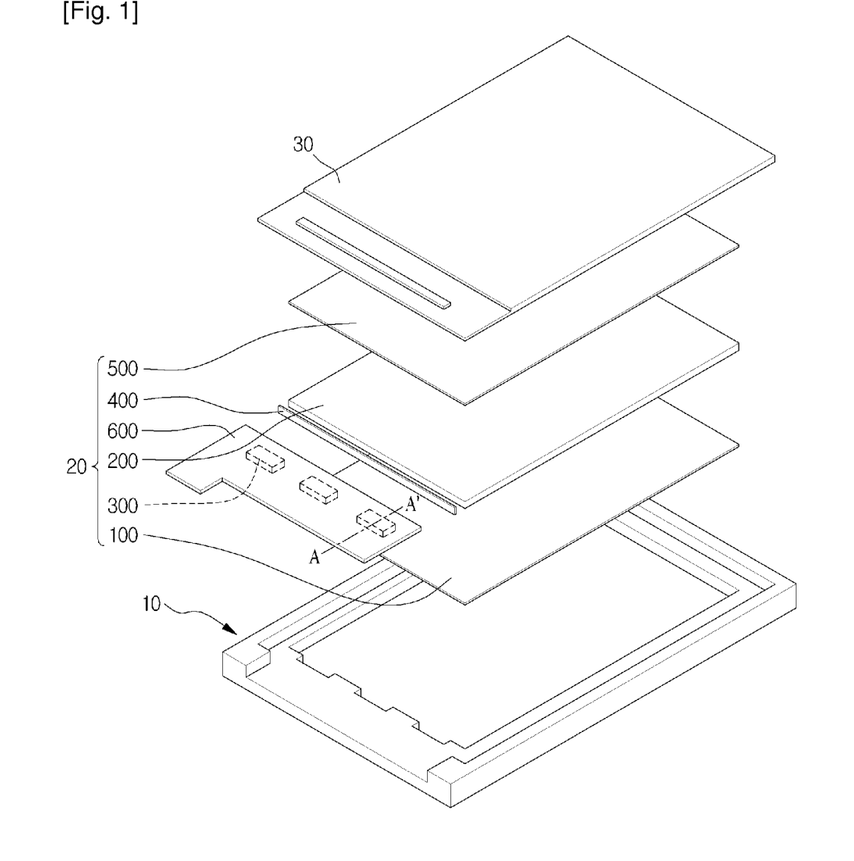
FIG. 1 is an exploded perspective view showing a liquid crystal display according to the embodiment.
Figure 2:
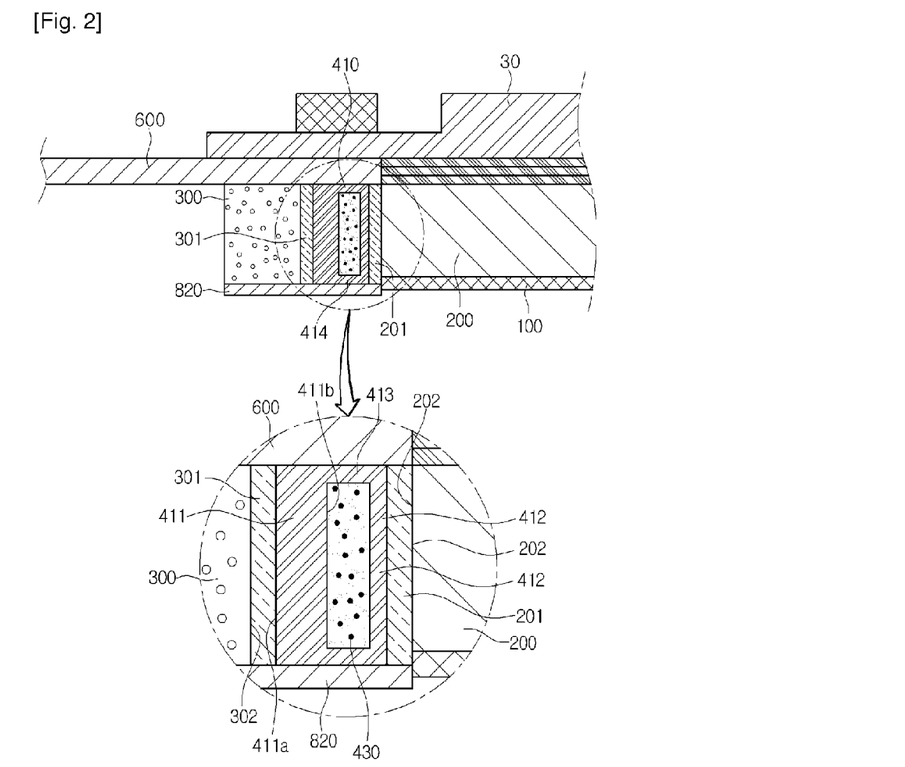
FIG. 2 is a sectional view taken along line A-A' of FIG. 1.
Figure 3:
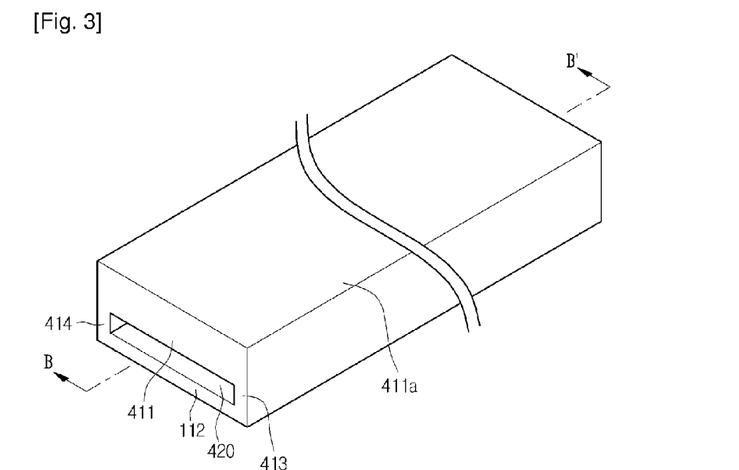
FIG. 3 is a perspective view showing a wavelength conversion member according to the embodiment.
Figure 4:
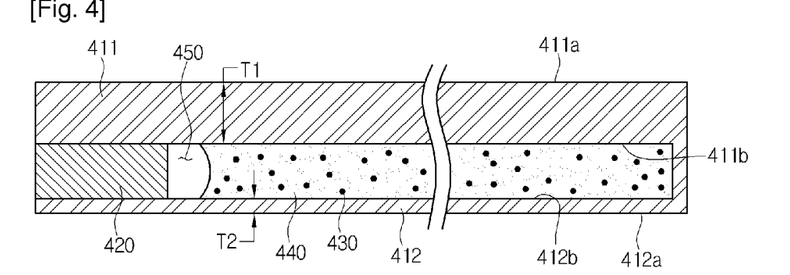
FIG. 4 is a sectional view taken along line B-B' of FIG. 3.
Figure 5:
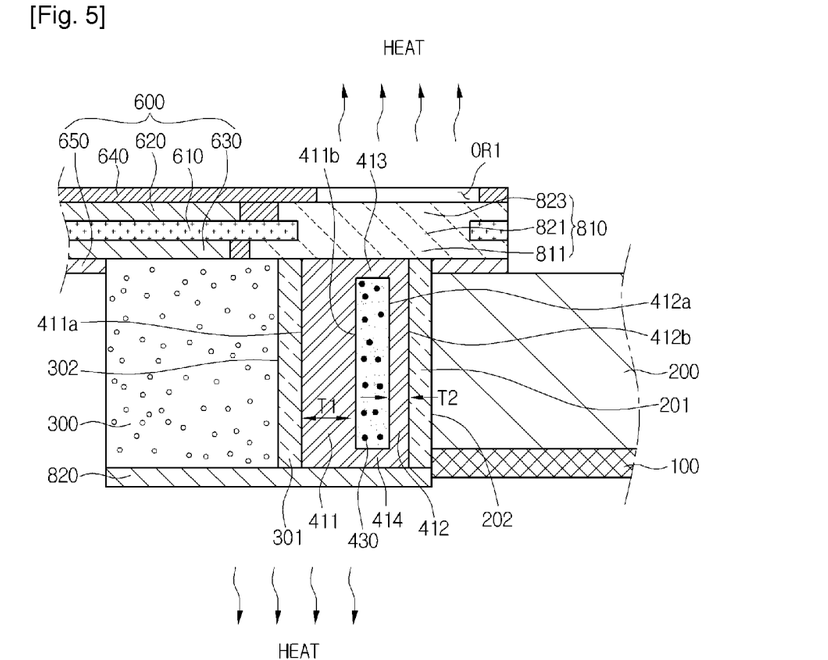
FIG. 5 is a sectional view showing a light emitting diode, an FPCB, a wavelength conversion member, and a light guide plate according to the embodiment.
Figure 6:
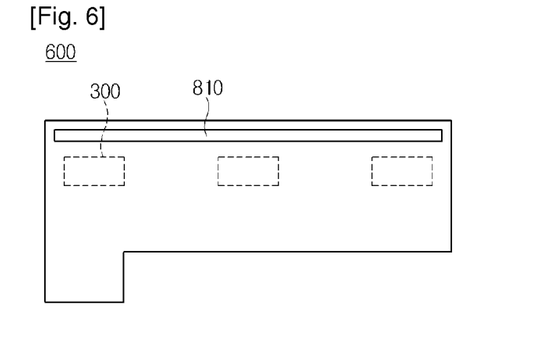
FIG. 6 is a plan view showing the FPCB.

FIG. 1 is an exploded perspective view showing a liquid crystal display according to the embodiment, FIG. 2 is a sectional view taken along line A-A' of FIG. 1, and FIG. 3 is a perspective view showing a wavelength conversion member according to the embodiment. FIG. 4 is a sectional view taken along line B-B' of FIG. 3, FIG. 5 is a sectional view showing a light emitting diode, an FPCB, a wavelength conversion member, and a light guide plate according to the embodiment, and FIG. 6 is a plan view showing the FPCB.

Referring to FIGS. 1 to 4, a liquid crystal display (LCD) according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10. The backlight assembly 20 generates light to supply the light toward the liquid crystal panel 30. The backlight assembly 20 includes a reflective sheet 100, a light guide plate 200, a light source, for example, light emitting diodes 300, a wavelength conversion member 400, a heat dissipating part 810, 820, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 receives light output from the light emitting diode 300 and reflects the light upward by reflecting, refracting and scattering the light.

The light guide plate 200 includes an incident surface 202 directed toward the light emitting diodes 300. From among lateral sides of the light guide plate 200, a lateral side directed toward the light emitting diodes 300 may serve as the incident surface 202.

The light emitting diodes 300 are disposed at the lateral side of the light guide plate 200. In detail, the light emitting diodes 300 are disposed at the incident surface 202.

The light emitting diodes 300 serve as a light source for generating the light. In detail, the light emitting diodes 300 emit the light toward the wavelength conversion member 400.

The light emitting diodes 300 generates a first light. For example, the first light may be a blue light. That is, the light emitting diodes 300 are blue light emitting diodes that emit the blue light. The first light is the blue light having the wavelength band of about 430 nm to about 470 nm. In addition, the light emitting diodes 300 may generate UV light.

The light emitting diodes 300 are mounted on the FPCB 600. The light emitting diodes 300 can be disposed under the FPCB 600. The light emitting diodes 300 are driven by receiving a driving signal through the FPCB 600.

The light conversion member 400 is disposed between the light emitting diodes 300 and the light guide plate 200. The light conversion member 400 is bonded to the lateral side of the light guide plate 200. In detail, the light conversion member 400 is attached to the incident surface 202 of the light guide plate 200. In addition, the light conversion member 400 can be bonded to a light incident surface 302 of the light emitting diodes 300. In more detail, the wavelength conversion member 400 may be bonded to the light emitting diode 300.

The light conversion member 400 receives the light from the light emitting diodes 300 to convert the wavelength of the light. For instance, the light conversion member 400 can convert the first light emitted from the light emitting diodes 300 into second and third lights.

In this case, the second light may be a red light and the third light may be a green light. In detail, the light conversion member 400 converts a part of the first light into the red light having the wavelength in the range of about 630 nm to about 660 nm, and a part of the first light into the green light having the wavelength in the range of about 520 nm to about 560 nm.

Thus, the first light passing through the light conversion member 400 is combined with the second and third lights converted by the light conversion member 400, so that the white light is generated. That is, the white light is incident into the light guide plate 200 through the combination of the first to third lights.

As shown in FIGS. 2 to 4, the light conversion member 400 includes a tube 410, a sealing part 420, a plurality of wavelength conversion particles 430, and a host 440.

The tube 410 receives the sealing part 420, the wavelength conversion particles 430 and the host 440 therein. That is, the tube 410 may serve as a receptacle to receive the sealing part 420, the wavelength conversion particles 430 and the host 440. In addition, the tube 410 extends with a long length in one direction.

The tube 410 may have a pipe shape. In detail, a section of the tube 410, which is vertical to the length direction of the tube 410, may have the trapezoid shape. The tube 410 may have a width of about 0.6 mm and a height of about 0.2 mm. The tube 410 may include a capillary tube.

The tube 410 is transparent. The tube 410 may include glass. In detail, the tube 410 may include a glass capillary tube.

The tube 410 may have an asymmetrical structure. In other words, the host 440 may be eccentrically provided in the tube 410. In more detail, the host 440 may be provided closer to the light guide plate 200 than to the light emitting diode 300. The host 440 includes a light incident part 411, a light exit part 412, a first extension part 413, and a second extension part 414.

The light incident part 411 is provided in opposition to the light emitting diode 300. The light incident part 411 is adjacent to the light incident surface 302 of the light emitting diode 300. The light incident part 411 is interposed between the light emitting diode 300 and the host 440. The light incident part 411 may be bonded to the light incident surface 302 of the light emitting diode 300.

In addition, the light incident part 411 may directly make contact with the host 440. The host 440 is sandwiched between the light incident part 411 and the light exit part 412. In other words, the host 440 is disposed between the light incident part 411 and the light exit part 412.

The light incident part 411 may extend in the extension direction of the wavelength conversion member 400. In other words, the light incident part 411 may extend in the extension direction of the tube 410. For example, the light incident part 411 may have the shape of a bar extending in the extension direction of the tube 410.

A thickness T1 of the light incident part 411 is greater than a thickness T2 of the light exit part 412. In other words, the distance between an outer surface 411a of the light incident part 411 and an inner surface 411b of the light incident part 411 is greater than the distance between an outer surface 412a and an inner surface 412b of the light exit part 412. For example, the thickness T1 of the light incident part 411 may be about 100 μm or more. In more detail, the thickness T1 of the light incident part 411 may be in the range of about 100 μm to about 1000 μm. In more detail, the thickness T1 of the light incident part 411 may be in the range of about 150 μm to about 300 μm.

The outer surface 411a and the inner surface 411b of the light incident part 411 may be a flat surface. In addition, the outer surface 411a and/or the inner surface 411b of the light incident part 411 may be a curved surface. If the light incident part 411 includes the curved surface, the average thickness of the light incident part 411 may be in the range of about 100 μm to about 1000 μm. In addition, if the light incident part 411 includes the curved surface, the minimum thickness of the light incident part 411 may be in the range of about 100 μm to about 1000 μm.

For example, even if the output power of the light emitting diode 300 may be in the range of about 50 mW to about 80 mW, the wavelength conversion particles 430 are hardly degraded if the thickness of the light incident part 411 is about 100 μm.

The light exit part 412 is opposite to the light incident part 411. In addition, the light exit part 412 is opposite to the light guide plate 200. In more detail, the light exit part 412 is opposite to the light incident surface 202 of the light guide plate 200. In addition, the light exit part 412 is close to the light guide plate 200. The light exit part 412 is closer to the light guide plate 200 than to the light emitting diode 300.

The light exit part 412 may extend in the extension direction of the wavelength conversion member 400. In other words, the light exit part 412 may extend in the extension direction of the tube 410. For example, the light exit part 412 may have the shape of a bar shape extending in the extension direction of the tube 410.

A thickness T2 of the light exit part 412 is less than a thickness T1 of the light incident part 411. In other words, the distance between the outer surface 412a of the light exit part 412 and the host 440 is less than the distance between the outer surface 411a of the light incident part 411 and the host 440. For example, the thickness T2 of the light exit part 412 may be in the range of about 10 μm to about 70 μm. In more detail, the thickness T1 of the light incident part 411 may be in the range of about 20 μm to about 50 μm.

The outer surface 412a and the inner surface 412b of the light exit part 412 may be a flat surface. In addition, the outer surface 412a of the light exit part 412 and/or the inner surface 412b of the light exit part 412 may be a curved surface.

The first extension part 413 extends from the light incident part 411 toward the light exit part 412. The first extension part 413 extends from an upper end of the light incident part 411 toward an upper end of the light exit part 412. The first extension part 413 is disposed on the host 440.

The second extension part 414 extends from the light incident part 411 toward the light exit part 412. The second extension part 414 extends from a lower end of the light incident part 411 toward a lower end of the light exit part 412. The second extension part 414 is provided under the host 440.

The host 440 is sandwiched between the first extension part 413 and the second extension part 414. In other words, the host 440 is interposed between the first extension part 413 and the second extension part 414. In other words, the first extension part 413 faces the second extension part 414 while being interposed the host 440 therebetween.

The light incident part 411, the light exit part 412, the first extension part 413, and the second extension part 414 surround the host 440. The host 440 is disposed in a space formed by the light incident part 411, the light exit part 412, the first extension part 413, and the second extension part 414. In addition, the light incident part 411, the light exit part 412, the first extension part 413, and the second extension part 414 may be integrally formed with each other.

The sealing part 420 is disposed in the tube 410. The sealing part 420 is arranged at an end of the tube 410 to seal the tube 410. The sealing part 420 may include epoxy resin.

The wavelength conversion particles 430 are provided in the tube 410. In detail, the wavelength conversion particles 430 are uniformly distributed in the host 440 installed in the tube 410.

The wavelength conversion particles 430 convert the wavelength of the light emitted from the light emitting diodes 300. The wavelength conversion particles 430 receive the light emitted from the light emitting diodes 300 and convert the wavelength of the light. For instance, the wavelength conversion particles 430 can convert the blue light emitted from the light emitting diodes 300 into the green light and the red light. That is, a part of the wavelength conversion particles 430 converts the blue light into the green light having the wavelength band in the range of about 520 nm to about 560 nm and a part of the wavelength conversion particles 430 converts the blue light into the red light having the wavelength band in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength band in the range of about 430 nm to about 470 nm, and a part of the wavelength conversion particles 430 converts the UV light into the green light having the wavelength band in the range of about 520 nm to about 560 nm. Further, a part of the wavelength conversion particles 430 converts the UV light into the red light having the wavelength band in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots include a semiconductor compound. In more detail, the quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general fluorescent pigment and has the superior quantum yield as compared with the general fluorescent pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The host 440 surrounds the wavelength conversion particles 430. In other words, the wavelength conversion particles 430 are uniformly distributed in the host 440. The host 440 includes polymer. The host 440 is transparent. That is, the host 440 includes transparent polymer.

The host 440 is disposed in the tube 410. In detail, the host 440 is fully filled in the tube 410. The host 440 may adhere to an inner surface of the tube 410.

An air layer 450 is formed between the sealing part 420 and the host 440. The air layer 450 is filled with nitrogen. The air layer 450 performs the damping function between the sealing part 420 and the host 440.

The wavelength conversion member 400 may be formed through the following scheme.

First, the wavelength conversion particles 430 are uniformly distributed in a resin composition. The resin composition is transparent. The resin composition 411 may have photo-curable property.

Then, internal pressure of the tube 410 is reduced, an inlet of the tube 410 is immersed in the resin composition in which the wavelength conversion particles 430 are distributed, and ambient pressure is increased. Thus, the resin composition having the wavelength conversion particles 430 is introduced into the tube 410.

Thereafter, a part of the resin composition introduced into the tube 410 is removed and the inlet of the tube 410 becomes empty.

Then, the resin composition introduced into the inlet of the tube 410 is cured by UV light so that the host 440 is formed.

Subsequently, epoxy resin composition is introduced into the inlet of the tube 410. Then, the epoxy resin composition is cured so that the sealing part 420 is formed. The process for forming the sealing part 420 is performed under the nitrogen atmosphere, so the air layer 450 including nitrogen may be formed between the sealing part 420 and the host 440.

The wavelength conversion member 400 may adhere to the light guide plate 200 through a first adhesive member 201. The first adhesive member 201 may be bonded to the light incident surface 202 of the light guide plate 200 and the outer surface 412a of the light exit part 412.

The wavelength conversion member 400 may adhere to the light emitting diode 300 through a second adhesive member 301. The second adhesive member 301 may be bonded to the light incident surface 302 of the light emitting diode 300 and the outer surface 411a of the light incident part 411.

The heat dissipating part is linked with the wavelength conversion member 400. In detail, the heat dissipating part may be directly or indirectly liked with the tube 410. In more detail, the heat dissipating part may be directly or indirectly linked with the light incident part 411. The heat dissipating part dissipates heat transferred from the wavelength conversion member 400.

Referring to FIGS. 1, 5, and 6, the heat dissipating part includes first and second heat dissipating parts 810 and 820.

The first heat dissipating part 810 is provided in the FPCB 600. In more detail, the first heat dissipating part 810 is provided inside the FBCB 600. The first heat dissipating part 810 may be included in the FPCB 600. In other words, the first heat dissipating part 810 may be a portion of the FPBC 600.

The first heat dissipating part 810 may be disposed on the wavelength conversion member 400. In addition, the first heat dissipating part 810 may extend in the extension direction of the wavelength conversion member 400. In addition, the first heat dissipating part 810 is liked with the wavelength conversion member 400. In more detail, the first heat dissipating part 810 may directly make contact with the wavelength conversion member 400.

The first heat dissipating part 810 may include material representing high thermal conductivity. For example, the first heat dissipating part 810 may include metal such as copper (Cu).

As shown in FIG. 5, the first heat dissipating part 810 includes a contact part 811, a connection via 821, and a heat radiation pad 823.

The contact part 811 directly or indirectly makes contact with the wavelength conversion member 400. The connection via 821 is connected to the contact part 811 and the heat radiation pad 823. In other words, the connection via 821 connects the contact part 811 with the heat radiation pad 823.

The heat radiation pad 823 is connected to the connection via 821. The heat radiation pad 823 may be exposed to the outside. The heat radiation pad 823 dissipates heat transferred from the wavelength conversion member 400 to the outside, especially, into the air.

The second heat dissipating part 820 is provided under the wavelength conversion member 400. In more detail, the second heat dissipating part 820 may be provided under the light emitting diodes 300. The second heat dissipating part 820 is connected to the wavelength conversion member 400. In more detail, the second heat dissipating part 820 may directly make contact with the wavelength conversion member 400.

The second heat dissipating part 820 may have a shape extending in an extension direction of the wavelength conversion member 400. For example, the second heat dissipating part 820 may have the shape of a bar or a strip extending in the extension direction of the wavelength conversion member 400.

The second heat dissipating part 820 may include a material having high thermal conductivity. For example, the second heat dissipating part 820 may include metal such as aluminum (Al) or copper (Cu).

The second heat dissipating part 820 may dissipate heat transferred from the wavelength conversion member 400 to the outside, especially, into the air.

The optical sheets 500 are disposed on the light guide plate 200 to improve the characteristic of the light passing through the optical sheets 500.

The FPCB 600 is electrically connected to the light emitting diodes 300. The FPCB 600 may mount the light emitting diodes 300 thereon. The FPCB 600 is installed in the mold frame 10 and arranged on the light guide plate 200.

Referring to FIG. 5, the FPCB 600 may include the first heat dissipating part 810. The FPCB 600 may include a support layer 610, a first interconnection layer 620, a second interconnection layer 630, a first protective layer 640, and a second protective layer 650.

The support layer 610 supports the first interconnection layer 620, the second interconnection layer 630, the first protective layer 640, and the second protective layer 650. The support layer 610 includes an insulating layer. The support layer 610 may be flexible. The material constituting the support layer 610 may include polymer such as polyimide-based resin.

The first interconnection layer 620 is provided on the support layer 610. The first interconnection layer 620 may directly make contact with the top surface of the support layer 610. The first interconnection layer 620 may include Cu.

The second interconnection layer 630 is provided under the support layer 610. The second interconnection layer 630 may directly make contact with the bottom surface of the support layer 610. The second interconnection layer 630 may include Cu. The first and second interconnection layers 620 and 630 may be connected to each other through a via formed through the support layer 610.

The second interconnection layer 630 is connected to the light emitting diodes 300. In more detail, the light emitting diodes 300 may be electrically connected to the second interconnection layer 630 through a solder or a bump.

The first protective layer 640 is provided on the first interconnection layer 620. The first protective layer 640 covers the first interconnection layer 620. The first protective layer 640 protects the first interconnection layer 620. The first protective layer 640 may include an insulator such as polymer.

The second protective layer 650 is provided under the second interconnection layer 630. The second protective layer 650 covers the second interconnection layer 630. The second protective layer 650 protects the second interconnection layer 630. The second protective layer 650 may include an insulator such as polymer.

The first heat dissipating part 810 may be included the FPCB 600. In other words, the heat radiation pad 823 may be formed in line with the first interconnection layer 620. In addition, the connection via 821 may be formed through the support layer 610. The connection via 821 may be formed in line with the second interconnection layer 630. In addition, the first protective layer 640 may be formed therein with a first open region OR1 to expose the top surface of the heat radiation pad 823 to the outside. In addition, the second protective layer 650 may be formed therein with a second open region OR2 to expose the contact part 811 to the wavelength conversion member 400.

The backlight unit is constructed by using the mold frame 10 and the backlight assembly 20. In other words, the backlight unit includes the mold frame 10 and the backlight assembly 20.

The liquid crystal panel 30 is provided inside the mold frame 10, and provided on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the thickness T1 of the light incident part 411 is greater than the thickness T2 of the light exit part 412. In particular, the thickness T1 of the light incident part 411 may be in the range of about 100 μm to about 1000 μm. Accordingly, after the light emitted from the light emitting diode 300 has been sufficiently diffused through the light incident part 411, the light is incident into the host 440.

Therefore, according to the liquid crystal display of the embodiment, the light emitted from the light emitting diode 300 can be prevented from being concentrated on a specific region so that the wavelength conversion particles 430 can be prevented from being degraded.

In addition, since the light incident part 411 is formed with a thick thickness, the heat emitted from the light emitting diode 300 can be easily transferred to the heat dissipating part. In other words, the light incident part 411 may serve as a heat transfer member. In other words, the light incident part 411 prevents heat emitted from the light emitting diode 300 from being transferred to the wavelength conversion particles 430, and transfers the heat to the heat dissipating part. Accordingly, the temperature of the wavelength conversion particles 430 can be reduced by the light incident part 411 and the heat dissipating part.

Therefore, the liquid crystal display according to the embodiment can represent improved reliability. According to the liquid crystal display of the embodiment, color reproduction can be prevented from being degraded due to the heat, and the whole wavelength conversion particles 430 can be used. Therefore, the liquid crystal display according to the embodiment can represent improved color reproduction.

In addition, since the light emitted from the light emitting diode 300 is sufficiently diffused through the light incident part 411, the liquid crystal display according to the embodiment can represent improved brightness and brightness uniformity.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A backlight assembly comprising:
   a reflective sheet;
   a light guide plate on the reflective sheet;
   a plurality of optical sheets on the light guide plate;
   a plurality of light sources disposed at an incident surface of the light guide plate; and
   a light conversion member between the light source and the light guide plate,
   wherein the light conversion member comprises:
   a tube;
   a host in the tube;
   an air layer in the tube; and
   a plurality of quantum dots in the host,
   wherein the tube comprises:
   a light incident part;
   a light exit part opposite to the light incident part;
   a first extension part connecting the light incident part to the light exit part;
   a second extension part connecting the light incident part to the light exit part and facing the first extension part while interposing the host therebetween;
   a first distal end;
   a second distal end opposite to the first distal end;
   a first tube portion;
   a second tube portion adjacent to the first tube portion; and
   a midpoint between the first distal end and the second distal end along a first direction that is parallel to a central longitudinal axis of the tube,
   wherein the first tube portion extends from the first distal end to the midpoint and comprises the air layer and a portion of the host,
   wherein the second tube portion extends from the midpoint to the second distal end and comprises a portion of the host;
   wherein the light incident part, the light exit part, the first extension part, and the second extension part are monolithically formed;
   wherein the tube extends in one direction along a lateral side of the light guide plate,
   wherein a thickness of a portion of the light incident part is greater than a thickness of a portion of the light exit part, and
   wherein the thickness of the portion of the light incident part is in a range of 100 μm to 1000 μm.

2. The backlight assembly of claim 1, wherein the light incident part, the light exit part, the first extension part, and the second extension part include glass.

3. The backlight assembly of claim 1, wherein the light source has power in a range of about 50 mW to about 80 mW.

4. The backlight assembly of claim 1, wherein a length of the portion of the host of the first tube portion, taken in the first direction, is less than a length of the portion of the host of the second tube portion, taken in the first direction.

5. The backlight assembly of claim 1, wherein the air layer is disposed between the light incident part and the light exit part.

6. The backlight assembly of claim 1, wherein the mass of the portion of the host of the first tube portion is smaller than the mass of the portion of the host of the second tube portion.

7. The backlight assembly of claim 1, wherein the air layer includes nitrogen.

8. The backlight assembly of claim 1, wherein the air layer is in direct contact with the host, and wherein at least a portion of a surface of the host in contact with the air layer is curved.

9. A display device comprising:
   a frame;
   a backlight assembly on the frame; and
   a liquid crystal panel on the backlight assembly,
   wherein the backlight assembly comprises:
   a reflective sheet;
   a light guide plate on the reflective sheet;
   a plurality of optical sheets on the light guide plate;
   a light source disposed at an incident surface of the light guide plate; and
   a light conversion member between the light source and the light guide plate,
   wherein the light conversion member comprises:
   a tube;
   a host in the tube;
   an air layer in the tube; and a plurality of quantum dots in the host;
wherein the tube comprises:
a light incident part;
a light exit part opposite to the light incident part;
a first extension part extending from the light incident part to the light exit part;
a second extension part extending from the light incident part to the light exit part and facing the first extension part while interposing the host therebetween;
a first distal end;
a second distal end opposite to the first distal end;
a first tube portion;
a second tube portion adjacent to the first tube portion; and
a midpoint between the first distal end and the second distal end along a first direction that is parallel to a central longitudinal axis of the tube,
wherein the first tube portion extends from the first distal end to the midpoint and comprises the air layer and a portion of the host,
wherein the second tube portion extends from the midpoint to the second distal end and comprises a portion of the host;
wherein the light incident part, the light exit part, the first extension part, and the second extension part are monolithically formed;
wherein the tube extends in one direction along a lateral side of the light guide plate,
wherein a thickness of a portion of the light incident part is greater than a thickness of a portion of the light exit part, and
wherein the thickness of the portion of the light incident part is in a range of 100 μm to 1000 μm.

10. The display device of claim 9, wherein the light source has power in a range of about 50 mW to about 80 mW.

11. The display device of claim 9, wherein each of the light incident part, the light exit part, the first extension part, and the second extension part includes glass.

12. The display device of claim 9, further comprising a heat dissipating part linked with the tube.

13. The display device of claim 9, further comprising an adhesive member adhering to the light exit surface of the light source and the light incident part.

14. The display device of claim 9, further comprising a PCB disposed at one side of the light source.

15. The display device of claim 14, further comprising an adhesive member disposed between the PCB and the light conversion member.

16. The display device of claim 14, wherein the PCB comprises a FPCB.

17. The display device of claim 9, wherein a length of the potion of the host of the first tube portion, taken in the first direction, is less than a length of the portion of the host of the second tube portion, taken in the first direction.

18. The display device of claim 9, wherein the mass of the portion of the host of the first tube portion is smaller than the mass of the portion of the host of the second tube portion.

19. The display device of claim 9, wherein the air layer includes nitrogen.

20. The display device of claim 9, wherein the air layer is in direct contact with the host, and wherein at least a portion of a surface of the host in contact with the air layer is curved.

* * * * *